UNITED STATES PATENT OFFICE.

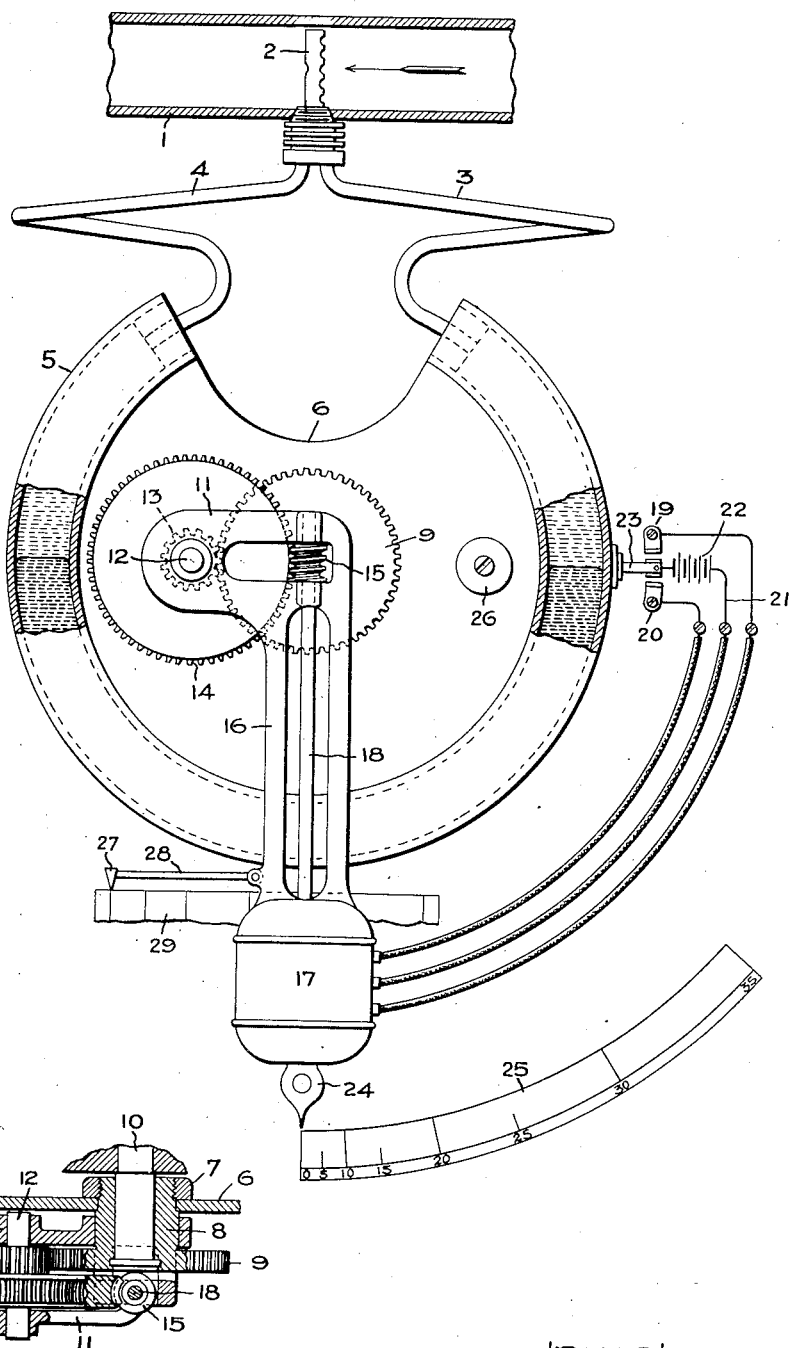

JAMES WILKINSON, OF SCHENECTADY, NEW YORK, ASSIGNOR TO GENERAL ELECTRIC COMPANY, A CORPORATION OF NEW YORK.

FLOW-METER.

1,160,679. Specification of Letters Patent. Patented Nov. 16, 1915.

Application filed September 9, 1913. Serial No. 788,854.

*To all whom it may concern:*

Be it known that I, JAMES WILKINSON, a citizen of the United States, residing at Schenectady, county of Schenectady, State of New York, have invented certain new and useful Improvements in Flow-Meters, of which the following is a specification.

This invention relates to apparatus for indicating the rate of flow of fluid through a conduit, for example, the quantity of steam in pounds per unit of time passing through a supply main.

The object of the invention is to simplify the construction without impairing the accuracy of the instrument.

In a well known type of flow meter, a differential pressure device in the steam conduit causes a body of heavy liquid to shift its position in two connected receptacles and thereby tilt a beam along which a counter-balancing weight is caused to travel by an electric motor whose circuit has been closed by the movement of the beam. The position of the weight when the beam comes to a condition of equilibrium is an indication of the rate of flow of the steam. My meter operates upon the same principle, but is quite different in construction. My mercury container is a tube curved on the arc of a circle and communicating at its ends respectively with the regions of higher and lower pressure of the pressure difference device. The tube is mounted to oscillate upon an axis at the center of the circle of which said tube is an arc. A gear is secured to said tube concentric therewith, and pivoted on the same axis is a pendulum which carries a pinion meshing with said gear. An electric motor, which preferably forms the bob of the pendulum, is geared to said pinion, and the circuit of said motor will be closed by a contact making arm operated by an oscillation of the mercury tube. When the differential pressure device has caused a shifting of the mercury and consequently a closing of the motor circuit, the pinion rides around the gear, swinging the pendulum away from the vertical position until it exerts a torque sufficient to counterbalance the unbalanced fluid pressure and restore the tube to a central position, thereby stopping the motor. Upon a change in flow of the steam, a further swinging of the pendulum will take place, its direction depending upon whether the flow has increased or diminished. A graduated scale coöperates with the pendulum to permit readings at any time of the rate of flow then occurring; and a recording device may be added to keep a permanent record for a given duration of time.

The invention is illustrated in the accompanying drawing, in which—

Figure 1 is a diagrammatic elevation of the meter, partly in section, and Fig. 2 shows a cross-section of the gearing.

The conduit 1 through which the fluid to be metered flows in the direction of the arrow contains a pressure difference device, preferably a modified Pitot structure such as the nozzle plug 2. The two regions of higher and lower pressure created by the pressure difference device are connected respectively by flexible pipes 3 and 4 to the closed ends of a container, comprising in the present case a tube 5 curved in the arc of a circle. The more flexible these connecting pipes 3, 4 are the better, since the opposition to movement will be less. Increasing the number of turns in the connector increases its flexibility. A web 6 supports said tube and is rigidly clamped by a nut 7 against a shoulder on a hub 8 integral with a gear wheel 9. The hub is mounted to turn freely on a stud 10 fixed in a suitable support. A body of heavy liquid, preferably mercury, fills the tube preferably up to the level of the horizontal diameter of the oscillating member comprising the tube, web and gear.

A frame 11 is mounted to turn on the hub 8 and carries an arbor 12 on which is journaled a pinion 13 meshing with the gear 9. A worm wheel 14, integral with or secured to the pinion, meshes with a worm 15, completing a train of reducing gearing of the sun and planet type. The frame 11 has a downward extension 16 forming a pendulum, and at the lower end thereof, constituting as it were the bob of the pendulum, is an electric motor 17, whose armature shaft 18 is extended upward and carries the worm 15. The motor is wound in such a manner that it can be easily reversed, as for instance, by having two oppositely wound field coils, one terminal of each being connected to its respective contact 19, 20, and having a common return 21 which is in circuit with a source of electric current such as a battery 22. A contact arm 23 is secured to the mercury tube 5 and plays between the contacts 19, 20, being itself connected to the battery 22. In the drawing the arm appears to have considerable range of movement, but in practice the gap would be not over a hundredth of an inch wide.

When there is no flow of fluid in the conduit, the tube 5 stands with the arm 23 midway between the contacts, the mercury being at the same height in both legs of the tube, and the pendulum hanging vertical with its pointer 24 coinciding with zero on the graduated scale 25. The weight of the pinion, worm wheel and lateral extension of the frame 11 is counterbalanced by the weight 26 secured to the web 6.

A given rate of flow of the fluid through the conduit sets up a differential pressure in the two ends of the tube 5, causing the mercury to become higher in the left-hand leg. This tilts up the contact arm against the contact 19 and starts the motor, thereby rotating the worm and turning the worm wheel and pinion. Since the gear is held stationary by its connection with the web 6, the pinion begins to ride down on the gear, thereby swinging the pendulum to the right. This movement continues until the angular position of the pendulum is such that it exerts a torque opposite and equal to that created by the higher fluid pressure in the right hand leg of the tube. The oscillating member therefore returns to its normal position, breaking the motor circuit and stopping the travel of the pinion around the gear. The parts thus remain balanced so long as the initial rate of flow continues, the pointer 24 indicating on the scale what the rate of flow is in pounds per hour. Any change in the rate of flow will cause a shifting of the mercury and the pendulum until they again balance each other in a new position corresponding with the altered rate of flow. The gearing between the rotor of the motor and the mercury container is of such character that the weight of the motor cannot cause the gears to turn. It is necessary to admit current to the motor for the purpose. A permanent record of the changes and the duration of each rate may be obtained by attaching a pen 27 to a link 28 pivoted to the pendulum, and traversed thereby over a ruled chart 29 moved by clockwork.

My improved meter has the advantage of being extremely simple and comprising few parts. Also, by reason of the electric motor, sufficient power is always available to move the counterbalancing weight which in this case is the motor itself. This arrangement renders the friction of the relatively movable parts a negligible quantity. The fact that all of the parts are mounted on one pivot, i. e., stud 10 makes for simplicity of construction and also renders the meter less liable to get out of order.

I have shown a container for the mercury that is well adapted for the purpose intended but it is evident that its construction can be altered without departing from my invention.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A flow meter comprising an oscillating mercury container, a pendulum connected thereto, and means controlled by the movement of said container for imparting angular movement to said pendulum independent of the movement of said container to cause the pendulum to counterbalance the excess internal pressure in one or the other part of said container.

2. A flow meter comprising a mercury container, a pivot on which it can oscillate, a gear wheel secured to said container, a pendulum suspended on said pivot, and a mechanism engaging with said gear wheel for imparting angular movement to said pendulum.

3. A flow meter comprising a mercury container, a pivot on which it can oscillate, a gear wheel concentric with said pivot and secured to said container, a pendulum suspended on said pivot, reducing gearing carried by said pendulum and meshing with said gear wheel, and an electric motor mounted on said pendulum and arranged to drive said gearing.

4. A flow meter comprising a mercury container, a pivot on which it can oscillate, a gear wheel concentric with said pivot and secured to said container, a pendulum suspended on said pivot, reducing gearing carried by said pendulum and meshing with said gear wheel, an electric motor mounted on said pendulum and arranged to drive said gearing, a contact arm actuated by said container, and a source of current in circuit with said motor and controlled by said arm.

5. A flow meter comprising a mercury tube in the form of an arc of a circle, a web supporting said tube, a hub at the center of said web, a pendulum journaled on said hub, and sun and planet gearing for swinging said pendulum to counteract the movement of the mercury tube.

6. A flow meter comprising a mercury tube in the form of an arc of a circle, a web supporting said tube, a hub at the center of said web, a pendulum journaled on said hub, sun and planet gearing for swinging said pendulum to counteract the movement of the mercury tube, and an electric motor constituting the bob of the pendulum and actuating said gearing.

7. A flow meter comprising a mercury tube in the form of an arc of a circle, a web supporting said tube, a hub at the center of said web, a pendulum journaled on said hub, sun and planet gearing for swinging said pendulum to counteract the movement of the mercury tube, a reversible electric motor constituting the bob of said pendulum, a contact arm on the tube, contacts in circuit with said motor between which said arm plays, and a source of current in circuit with said arm and motor.

8. A flow meter comprising an oscillating container having the shape of an arc of a circle and inclosing a body of fluid that is heavier than that being metered, a counter-balance for the container pivoted on the same center as is the container, and motion transmitting means between the container and the coutner-balance for moving the counter-balance independently of the container.

9. A flow meter comprising an oscillating mercury container, a pivot therefor, a pendulum supported by the same pivot, and a means controlled by the movements of the container for causing the pendulum to move by an amount sufficient to restore the container to normal position.

In witness whereof, I have hereunto set my hand this 8th day of September, 1913.

JAMES WILKINSON.

Witnesses:
BENJAMIN B. HULL,
HELEN ORFORD.